Aug. 27, 1940.　　　　D. I. BROWN　　　　2,212,806
POWER TRANSMISSION MECHANISM
Filed Sept. 19, 1938　　　3 Sheets-Sheet 1

Inventor
Deskin I. Brown
By Marechal & Noi
Attorney

Aug. 27, 1940.   D. I. BROWN   2,212,806
POWER TRANSMISSION MECHANISM
Filed Sept. 19, 1938   3 Sheets-Sheet 3
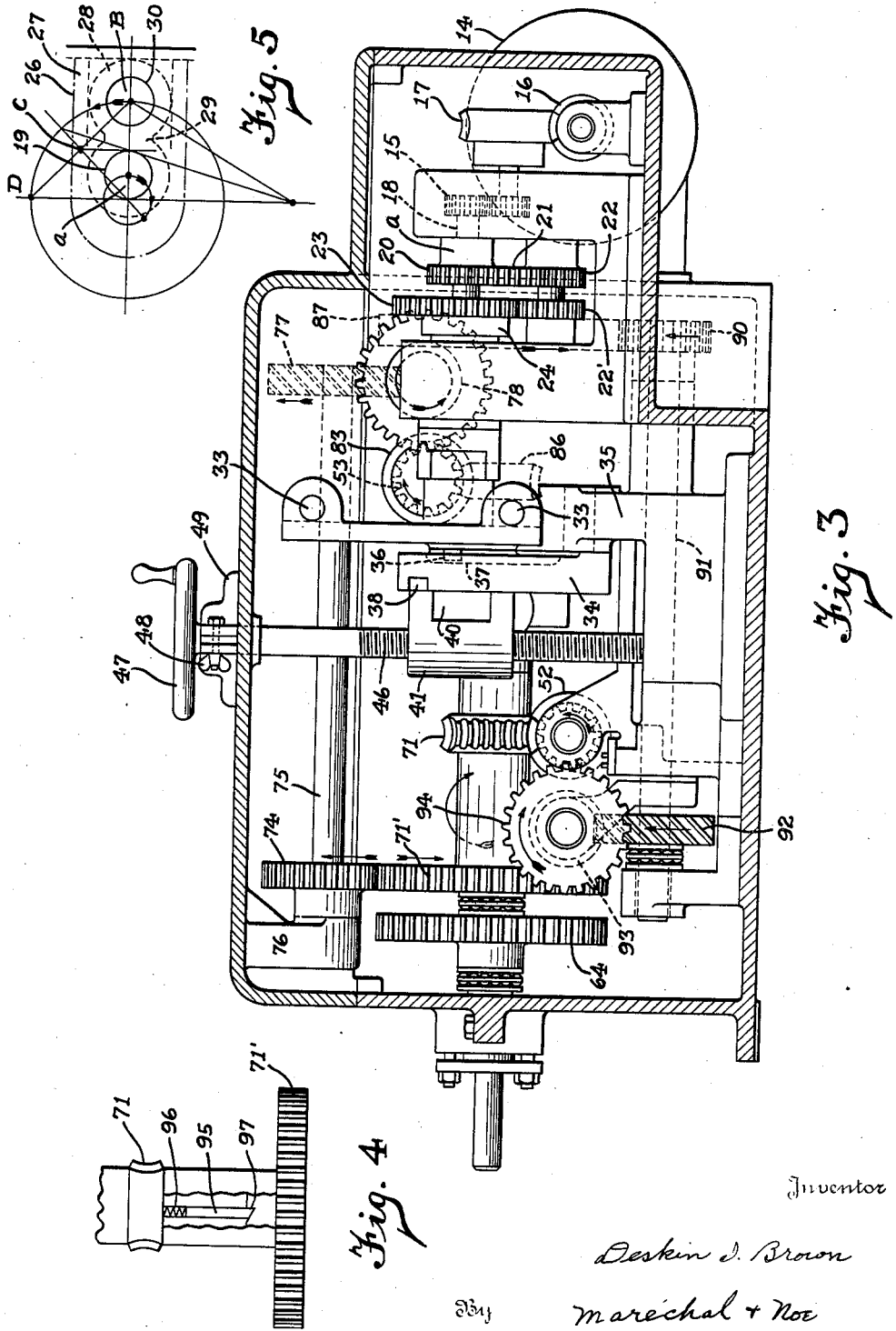

Patented Aug. 27, 1940

2,212,806

UNITED STATES PATENT OFFICE 2,212,806

POWER TRANSMISSION MECHANISM

Deskin I. Brown, Laura, Ohio, assignor of one-half to Walter J. Steiner, Laura, Ohio Application September 19, 1938, Serial No. 230,553

10 Claims. (Cl. 74—117)

This invention relates to power transmission means and more particularly to power transmissions in which variations in the relative speed of driving and driven members is desired.

One object of the invention is the provision of a power transmission mechanism providing for relative speed variations between the driving and driven members and incorporating a reciprocatory member, the stroke of which may be changed, and screws which are moved endwise thereby and which are effective successively on a driven means to provide continued rotation of the driven means in one direction.

Another object of the invention is the provision of a variable speed power transmission of the character mentioned and having reciprocating screws, the reciprocatory motion of each screw operating to turn the other screw at a rate so coordinated with the speed of reciprocation of such other screw as to hold the means operated by such other screw from rotating, so that the screws will successively act to impart rotational movement to the same driven member.

Another object of the invention is the provision of a variable speed changing mechanism of the character mentioned, operated by a rotatable arm which is effective through an oscillating lever to provide reciprocatory movement of the screw moving means, the connection between the oscillatory lever and the screw moving means being adjustable towards and from the axis of oscillation of the lever to provide different stroke lengths for the screws.

Another object of the invention is the provision of a variable speed changing mechanism in which an oscillating lever is operated by a rotatable driving member having a radius arm the effective length of which is variable throughout the rotational movements of the arm to equalize the angular travel of the operated mechanism in different portions of each 90° movement of the arm.

Another object of the invention is the provision of a variable speed changing mechanism of the character mentioned and including a rotatable arm adapted to provide oscillatory movement of the driven part, the arm being mounted on an eccentric which rotates in a direction opposed to the direction of rotation of the arm and at a speed three times that of the arm to equalize the length of the reciprocatory stroke for each 45° of rotation of the rotatable arm.

Other objects and advantages of the invention will be apparent from the following description, the appended claims and the accompanying drawings, in which:

Fig. 3 is a vertical section on the line 3—3 of Fig. 1;

Fig. 4 is a detail view showing the one way driving clutch for one of the operating gears; and Fig. 5 is a diagrammatic view showing the operation of the eccentrically mounted operating arm.

Figure 1:
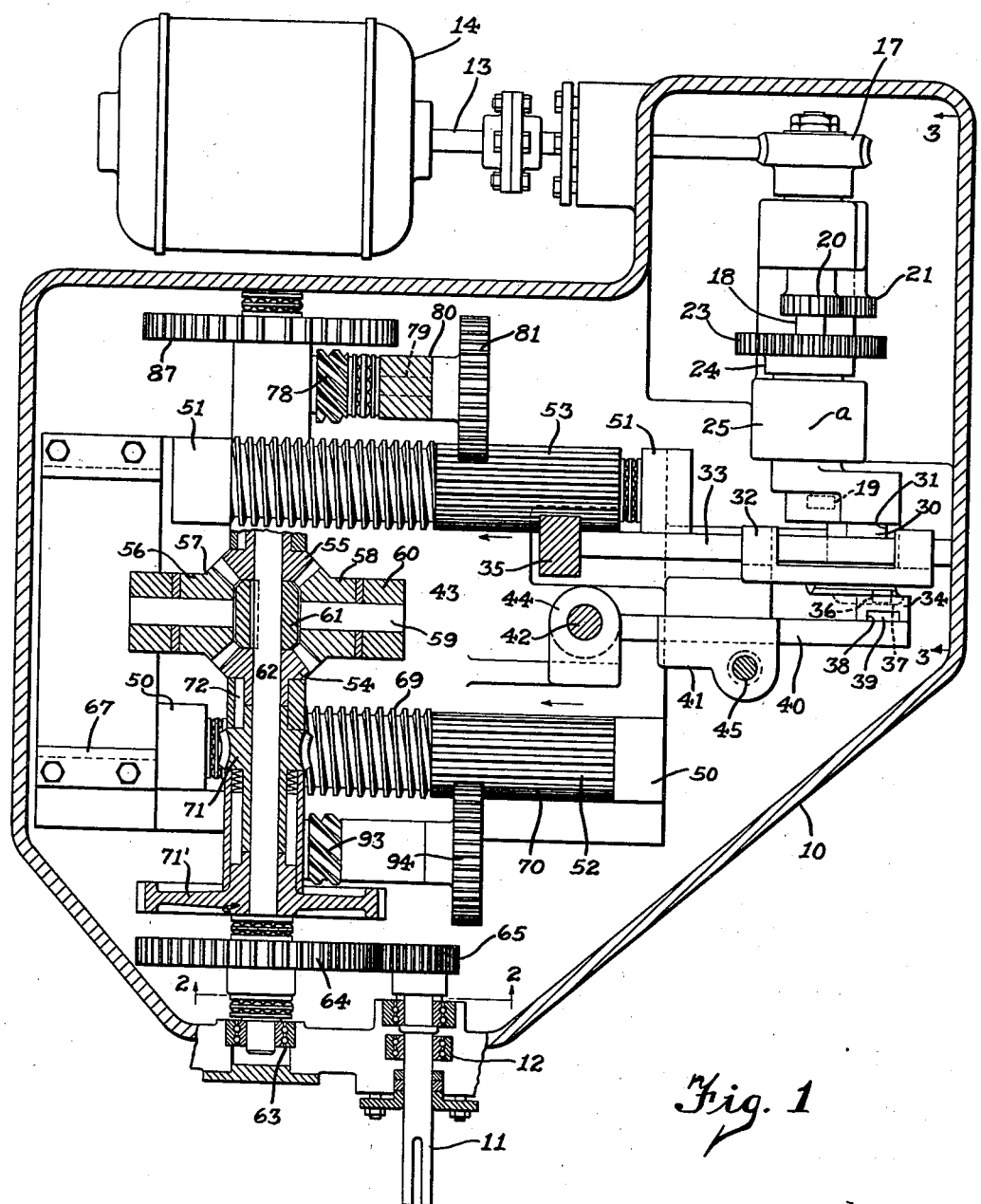
Fig. 1 is a top plan view of a speed changing mechanism incorporating the present invention, the cover part of the gear casing being removed and a portion of the mechanism being shown in horizontal section.

Referring more particularly to the drawings by reference numerals, 10 generally designates a housing providing for the rotatable support of a driven power take-off shaft 11, preferably by means of antifriction bearings 12, the shaft being operated by mechanism contained within the housing and driven by a motor shaft 13 operated at a suitable speed from the electric motor or other driving device 14. The mechanism contained within the housing 10 is operable to change the speed of rotation of the driven shaft 11 with respect to the speed of the driving shaft 13, the latter operating continuously preferably at a uniform speed.

Figure 2:
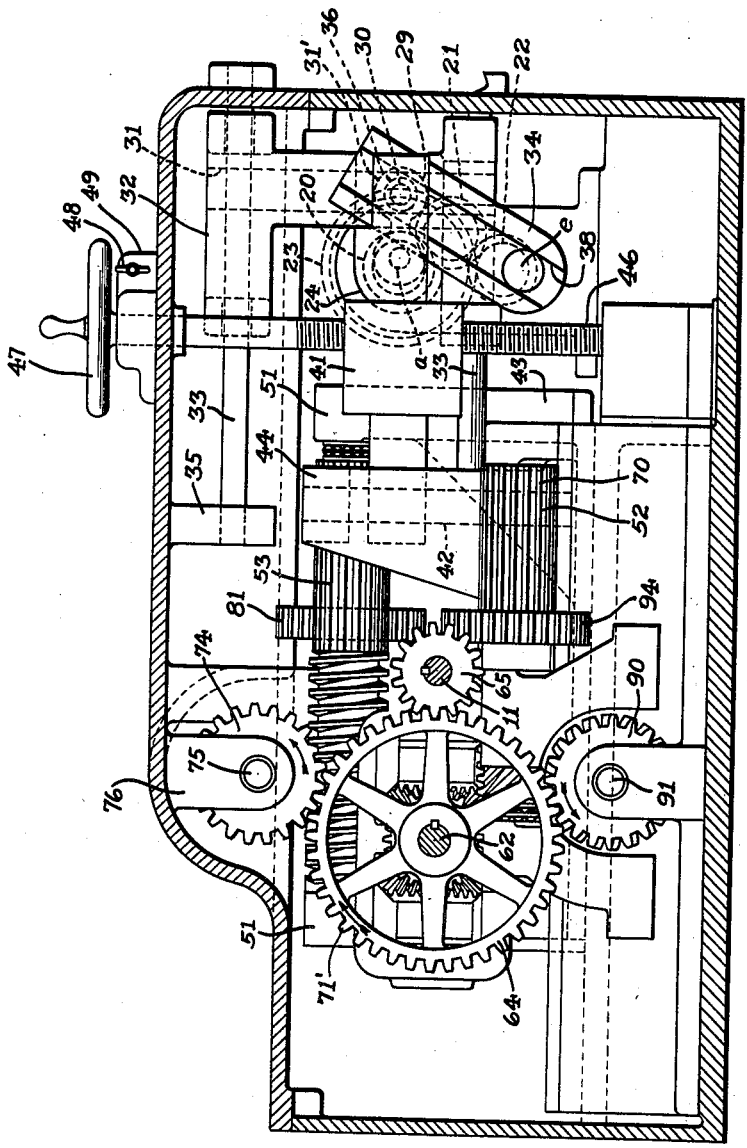
Fig. 2 is a vertical section on the line 2—2 of Fig. 1, viewing the mechanism from one end thereof.

The shaft 13 operates a worm gear 16 which meshes with a worm 17 that is connected by gearing 15 to a shaft 18 rotatable about an axis a, see Figs. 1, 2 and 3. The shaft 18 projects downwardly as viewed in Fig. 1 and is provided at the end thereof with an eccentric 19, the purpose of which will be described presently. Fixed on the shaft 18 is a gear 20 meshing gear 21 which meshes in turn with a gear 22. The latter is fixed on the same short shaft with a gear 22' which meshes with a large gear 23 concentric with the axis a and serving to rotate the gear hub 24 of gear 23 at one-third the speed of rotation of the eccentric 19 and of the shaft 18. The hub 24 projects through and is rotatably mounted in a bearing portion 25, see Fig. 1, and carries a rotatable substantially U-shaped part 26. The part 26 rotates about the fixed axis a.

Between the legs 27 of part 26 is the end 28 of a crank or radius arm 29 the inner end of which is rotatably mounted on the eccentric 19 as shown in Figs. 2 and 5. Carried by the outer end 28 of the crank arm 29 is a driving pin 30 which operates in a vertical slot 31 provided in a slide 32, see Fig. 2. The slide 32 is mounted for horizontal movement on a pair of transverse rods 33 one end of each of the rods 33 being fixed in the side wall of the housing and the other being supported in suitable brackets 35.

Rotational movements of the part 26, which is driven by the motor through the gearing as above mentioned, is imparted to the arm 29.

As the driving pin 30 on arm 29 rotates, let us say counterclockwise as indicated in Fig. 5 at a speed of about 80 R. P. M. for example, the center of the driving pin 30 will move in a non-circular path because the crank arm 29 is eccentrically operated at its inner end, the eccentric 19 moving at a speed of 240 R. P. M. and in an opposite direction or clockwise. With this arrangement the center of the crank pin 30 will travel from the point C and then to point D, as the part 29 and the crank arm move through 90°, the point C being exactly midway between points B and D so that the reciprocatory movement imparted to the slide 32 is such as to give equal length of reciprocation for each 45° travel of the crank arm. There thus obtains a much more even and regular speed of reciprocation throughout the stroke of the slide 32 than a simple crank and crank arm motion would give.

The reciprocatory movements of the slide 32 are of constant length and in a device in which a constant speed electric motor is employed there is a substantially uniform speed of reciprocation for slide 32, at least throughout the major part of its stroke. To provide different speeds of reciprocation for the driven mechanism which operates the shaft 11 at different speeds, the slide 32 is connected to an oscillatory lever adapted to move back and forth about a fixed pivot axis and having a driving connection which can be adjusted towards or away from the axis of oscillation of the lever or be made to coincide with that axis. This lever is shown at 34 and is adapted to oscillate about an axis e by means of a suitable pivot support on a fixed standard portion 35, see Figs. 2 and 3. The lever 34 is operably interconnected to the slide 32 by means of a pin projection 36 fixed on the latter and slidably engaging a groove 37 which is provided in the lever 34 and extending towards the axis e. As the slide 32 reciprocates it will thus be apparent that the lever 34 is oscillated through a fixed angular path of travel and in time with the slide. The lever 34 is also provided with a second groove 38 on the opposite side of the lever from groove 37, the groove 38 extending down to and past the axis e. Engaging this groove 38 is a pin 39 carried by a reciprocating bar 40, see Figs. 1 and 3. This bar is slidably mounted in a bracket 41 and projects through the bracket into engagement with a post 42 provided on a reciprocatory frame 43, the inner end of the bar 40 having an eye 44 surrounding the post 42 and along which the eye may be moved. The bracket 41 is provided with screw threads 45 engaged by a threaded stud 46, the latter projecting upwardly through the upper wall of the housing and carrying an operating lever or handle 47 which may be manually turned to raise or lower the bracket 41 and thus bring the point of interconnection between the reciprocatory frame 43 and the oscillatory lever 34 farther from or closer to the axis of oscillation e of the lever 34. This varies the stroke of the reciprocatory frame 43, and if the center of the pin 39 is brought into coincidence with the axis e it will be apparent that the lever 34 may oscillate back and forth without producing any movement of the reciprocatory frame 43. The amount of the stroke of the reciprocatory frame 43 may thus be readily controlled, even during operation of the mechanism, merely by adjusting the control member 47, the vertical height of the bracket 41 being then held fixed in any desired position by tightening the thumb screw 48 provided on a split bracket support 49 which clamps the upper end of the threaded stud 46.

The reciprocating frame 43 is provided with bearings 50 and 51 which rotatably support the opposite ends of screws 52 and 53 respectively. These screws 52 and 53 are adapted to successively operate bevel gears 54 and 55 forming part of a differential gearing 56 including gear pinions 57 and 58 which mesh with the gears 54 and 55 and which are rotatably supported by means of shaft sections 59 on a common supporting ring 60. The shaft sections 59 extend into and operate the hub portion 61 which is keyed to a shaft 62 on which the bevel gears 54 and 55 are rotatably mounted. The shaft 62 extends downwardly as viewed in Fig. 1 and is rotatably mounted at its opposite ends in antifriction bearings 63 provided in the housing 10. Fixed to the shaft 62 adjacent one of the bearings 63 is a gear 64 which meshes with the driven gear 65, the latter being fixed on the inner end of the shaft 11. As the bevel gears 54 and 55 successively turn the shaft 62, operating to turn the shaft 62 in the same direction, the driven shaft 11 will thus be correspondingly rotated.

As viewed in Fig. 1 the parts are in their extreme right-hand position, the reciprocating frame 43, which is slidably mounted for horizontal movement in the guides 67, being shown at its extreme right-hand limit of travel. As the reciprocating member 43 moves to the left, the screws are moved endwise or axially as indicated by the arrows in Fig. 1. Both screws are of similar construction, the screw 52 having screw threads 69 of irreversible lead and also having gear teeth 70. The threads of the screw engage a worm wheel 71 so that when the screw 52 moves to the left without rotating on its own axis, it turns the worm wheel 71 which is connected by means of a pin 72 to the gear 54, both the worm wheel 71 and the gear 54 being free on the shaft 62. The gear 54 is thus rotated through an angle dependent on the stroke of the screw 52, and rotates the shaft 62 in one direction, the gear 55 which is operated by the other screw 53 being held stationary at the time since each screw is provided with means for rotating the other screw at a speed such as to prevent rotational movements of the gear operated by that other screw and thus hold that gear stationary during the effective stroke of the screw first mentioned. Thus the worm gear 71, in turning, operates a gear 71' to which it is connected by a one-way driving clutch permitting some relative rotational movements of these two gears in one direction only. Gear 71' meshes with a gear 74 which is fixed to a carrying shaft 75 supported by a bracket 76 as shown in Figs. 2 and 3. Carried by the shaft 75 is a worm wheel 77 which meshes with a worm 78. The latter is fixed on a shaft 79 rotatably mounted in a bracket 80 and having fixed to it a gear 81 which meshes with the gear teeth on the screw 53. Through this gear connection between the worm wheel 71 and the gear teeth on the screw 53, the latter is rotated about its own axis, the gearing being such as to rotate the screw 53 at such a rate as to cause the threads on the screw 53 to keep the worm gear 83 from rotating, the worm gear 83 being the gear operated by the screw 53 during the effective stroke of the latter and corresponding to the gear 71 in construction except that its teeth are in an opposite direction since the screw 53 is arranged above the gear 83 while screw 52 is below gear 71.

During the reciprocatory movement of the screw 52 towards the left in Fig. 1, it will thus be seen that the bevel gear 54 is rotated and that a driving connection is provided for rotating the other screw at such a speed as to hold the gear 55 from rotating. On the return stroke of screw 52, however, the screw 52 will be rotated by mechanism driven from the screw 53 so as to hold the worm gear 71 stationary, the screw 53 then performing the driving operation by rotating gear 83 to turn the gear 55 and thus turn the shaft 62 in the same direction it was turned by the gear 54. The driving connections between the two screws are similar, the worm gear 86 being connected through a one-way driving clutch to a spur gear 87 meshing with gear 90 on shaft 91, the latter being provided with a spiral worm 92 meshing with spiral worm gear 93, the latter being fixed to spur gear 94 which engages the gear teeth 70 on the screw 52.

The one-way driving connection or clutch provided between the worm wheel 71 and gear 71' is preferably effected by means of a plurality of keys 95 (see Fig. 4) slidably carried for endwise movement in the hub portion of the worm wheel 71 and spring pressed outwardly by means of springs 96 so that the ends 97 of these keys engage in notches provided in the hub portion of the gear 71' when the screw 52 moves to the left as viewed in Fig. 1. The one-way driving connection between the gear 55 and its operating worm wheel 86 is of similar construction and is effective during the time the screw 53 moves to the right.

As will now be apparent the gears 54 and 55 are operated in reverse directions, in a successive manner, by the two screws during the successive strokes of the reciprocating member 43 so as to turn the shaft 62 continuously in one direction and at a speed dependent upon the stroke of the screws. As all the operating parts are mechanically interconnected in a definite fixed relationship to one another for any setting of the speed adjusting screw 46, the speed of the driven shaft 11 will be exactly determined by the positioning of the bracket 41 which determines the location of the driving interconnection between lever 34 and the reciprocating frame 43 with respect to the axis of oscillation of the lever 34, and this exact speed relationship will be constant and fixed for any setting of the bracket 41 and provide a positive power transmission. The speed variation permitted is such that the shaft 11 may remain stationary during the continued constant speed operation of the motor shaft, or may be driven at any desired speed, the speed variation being adjustable through infinitely small increments.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A variable speed changing mechanism comprising a pair of screws, means for reciprocating said screws in axial directions, means for changing the stroke of reciprocation of said screws, rotatable members operated respectively by reciprocatory non-rotative movement of each of said screws, driven means operated in one direction by successive operation of said members, and means operated by reciprocatory movement of each screw for rotating the other screw at a rate coordinated with its speed of reciprocation.

2. A variable speed changing mechanism comprising a pair of screws, carrying means for said screws, rotatable driving means for reciprocating said carrier means, means interposed between said carrier means and rotatable driving means operable to change the stroke of reciprocation of said carrier means, rotatable gears operated respectively by reciprocatory non-rotative movement of each of said screws, driven means operated in one direction by successive operation of said gears, and means operated by reciprocatory movement of each screw for rotating the other screw at a rate coordinated with its speed of reciprocation.

3. A variable speed changing mechanism comprising a pair of screws, carrying means for said screws, rotatable driving means for reciprocating said carrier means, means interposed between said carrier means and rotating driving means operable to change the stroke of reciprocation of said carrier means, rotatable gears operated respectively by reciprocatory non-rotative movement of each of said screws, driven means operated in one direction by successive operation of said gears, and means operated by reciprocatory movement of each screw for rotating the other screw at a rate so coordinated with its speed of reciprocation as to hold the gear operated by such other screw from rotating.

4. Variable speed changing mechanism comprising a pair of screws, means for reciprocating said screws in axial directions, means for changing the stroke of reciprocation of said screws, rotatable gears operated respectively by reciprocatory non-rotative movement of each of said screws, driven means operated in one direction by successive operation of said gears, gear teeth on each of said screws, and a pair of auxiliary gears one operated by reciprocatory movement of each screw for rotating the other screw through said gear teeth at a rate so coordinated with the speed of reciprocation of such other screws as to hold the gear operated by such other screw from rotating.

5. Variable speed changing mechanism comprising a pair of screws, means for reciprocating said screws in axial directions, means for changing the stroke of reciprocation of said screws, rotatable gears operated respectively by reciprocatory non-rotative movement of each of said screws, driven means operated in one direction by successive operation of said gears, gear teeth on each of said screws, a pair of auxiliary gears operated by reciprocatory movement of each screw for rotating the other screw through said gear teeth at a rate so coordinated with the speed of reciprocation of such other screws as to hold the gear operated by such other screw from rotating, and a one-way drive clutch between each of said auxiliary gears and the screw which operates it.

6. Variable speed changing mechanism comprising a pair of screws, means for reciprocating said screws in axial directions, means for changing the stroke of reciprocation of said screws, rotatable gears operated respectively by reciprocatory non-rotative movement of each of said screws, driven means operated in one direction by successive operation of said gears, screw operating means operated by reciprocatory movement of each screw for rotating the other screw at a rate coordinated with its speed of reciprocation, and a lost motion connection between each of said screws and the screw-operating means which it operates.

7. Variable speed changing mechanism comprising a pair of screws, a common carrier for said screws, a rotatable driving member, means operated by said driving member for reciprocating said carrier means, a rotatable driven member, a plurality of means operated successively by reciprocatory movement of said screws for operating said driven member in one direction, and means operated by non-rotative movement of one of said screws for rotating the other screw at a rate coordinated with its speed of reciprocation.

8. Variable speed changing mechanism comprising a pair of screws, a rotatable driving member, a reciprocable slide carrying both of said screws, means interposed between the rotatable driving member and the reciprocable slide and operable during the continued operation of said driving member to change the stroke of said reciprocable slide, means operated by non-rotative movement of one of said screws for rotating the other screw at a rate coordinated with its speed of reciprocation, and means rotatably operated successively by said screws for continued movement in one direction.

9. In a variable speed changing mechanism of the character described, a rotatable driving member having a radius arm, a pivoted oscillatory lever operated thereby, reciprocating means operated by said lever, a connection means between said lever and said reciprocating means, means operable to adjust the connection means to different distances from the axis of said lever, and means for varying the effective length of said radius arm at predetermined times in the rotation of said driving member to equalize the angular travel of said lever in different successive equal portions of each 90° movement of said driving member.

10. In a variable speed changing mechanism of the character described, a rotatable driving member having a radius arm, a pivoted oscillatory lever operated thereby, reciprocating means operated by said lever, a connection means between said lever and said reciprocating means, means operable to adjust the connection means to different distances from the axis of said lever, a rotatable eccentric mounting for said radius arm, and means for rotating said eccentric mounting in a direction opposed to the direction of rotation of said arm and at a speed three times that of the radius arm to equalize the angular travel of said lever in different portions of each 90° movement of said driving member.

DESKIN I. BROWN.